United States Patent
Cathrow et al.

(10) Patent No.: US 10,230,691 B2
(45) Date of Patent: Mar. 12, 2019

(54) SYSTEMS, DEVICES, AND METHODS FOR IMPROVED DOMAIN NAME SYSTEM FIREWALL PROTECTION

(71) Applicant: VERISIGN, INC., Reston, VA (US)

(72) Inventors: Andrew Cathrow, Ashburn, VA (US); Stephen Daniel James, South Riding, VA (US)

(73) Assignee: VERISIGN, INC., Reston, VA (US)

( * ) Notice: Subject to any disclaimer, the term of this patent is extended or adjusted under 35 U.S.C. 154(b) by 132 days.

(21) Appl. No.: 15/014,647

(22) Filed: Feb. 3, 2016

(65) Prior Publication Data
US 2017/0222978 A1    Aug. 3, 2017

(51) Int. Cl.
*H04L 29/06* (2006.01)
*H04L 29/12* (2006.01)
*H04L 12/46* (2006.01)
*H04L 29/08* (2006.01)

(52) U.S. Cl.
CPC ...... *H04L 63/0272* (2013.01); *H04L 12/4641* (2013.01); *H04L 61/1511* (2013.01); *H04L 61/1552* (2013.01); *H04L 61/2007* (2013.01); *H04L 63/02* (2013.01); *H04L 63/0236* (2013.01); *H04L 63/1433* (2013.01); *H04L 67/10* (2013.01)

(58) Field of Classification Search
CPC .......................... H04L 61/1511; H04L 63/0227
See application file for complete search history.

(56) References Cited

U.S. PATENT DOCUMENTS

| | | | | |
|---|---|---|---|---|
| 7,600,011 B1 * | 10/2009 | Urbanek | ........... | H04L 29/12066 709/203 |
| 7,792,994 B1 * | 9/2010 | Hernacki | ............... | H04L 12/66 709/229 |
| 2009/0113074 A1 | 4/2009 | Statia et al. | | |
| 2009/0313384 A1 | 12/2009 | Baratakke et al. | | |
| 2010/0242092 A1 * | 9/2010 | Harris | .................... | H04L 63/08 726/3 |

(Continued)

FOREIGN PATENT DOCUMENTS

WO    2012/0162099 A1    11/2012

OTHER PUBLICATIONS

Dennis. "How to Set Up DNS Resolution Between On-Premises Networks and AWS Using AWS Directory Service and Amazon Route 53." Feb. 1, 2016. 5 pages. Included in applicant's IDS.*

(Continued)

*Primary Examiner* — Jason K Gee
(74) *Attorney, Agent, or Firm* — Artegis Law Group, LLP

(57) ABSTRACT

Embodiments relate to systems, devices, and computing-implemented methods for resolving DNS requests by sending, from a device, a first DNS request for a domain name associated with a local service device to a DNS firewall server. The DNS firewall server can send a response that includes a status indicating a server failure in response to determining that the first DNS request is associated with a customer of a DNS firewall service and determining that a record associated with the domain name cannot be found. The device can receive the response and send a second DNS request to an internal DNS server in response to the status indicating the server failure.

20 Claims, 5 Drawing Sheets

(56) References Cited

U.S. PATENT DOCUMENTS

2012/0324094 A1* 12/2012 Wyatt .................... H04L 63/20
709/224
2016/0014081 A1* 1/2016 Don, Jr. ............. H04L 63/0236
726/11

OTHER PUBLICATIONS

Extended European Search Report for Application No. 17154587.4, dated Jun. 6, 2017, 8 pages.
Dennis, "How to Set Up DNS Resolution Between On-Premises Networks and AWS Using AWS Directory Service and Amazon Route 53", AWS Security Blog, Feb. 1, 2016, pp. 1-5, XP055375684.

* cited by examiner

SYSTEMS, DEVICES, AND METHODS FOR IMPROVED DOMAIN NAME SYSTEM FIREWALL PROTECTION

CROSS-REFERENCE TO RELATED APPLICATIONS

This application is related to U.S. patent application Ser. No. 15/010,155, entitled "Domain Name Resolution," filed on 29 Jan. 2016, the contents of which are hereby incorporated herein by reference in its entirety.

BACKGROUND

The Domain Name System (DNS) allows systems to connect with each other to communicate by associating domain names with numerical addresses. In some instances, DNS can refer to a global directory of domain names for use as part of the Internet. In other instances, DNS can be used internally by, for example, allowing users to access local resources available to users within the internal network. Examples of local resources include, but are not limited to, computing devices on the local network, mobile devices, printers, servers, storage devices, wireless routers, scanners, database servers, etc.

Due to increases in cyber threats such as, for example, malware, botnets, Denial of Service or Distributed Denial of Service attacks (hereinafter "DoS" referring to either or both), etc., an organization can leverage a DNS firewall to mitigate cyber threats. A DNS firewall is a cloud-based network security and threat intelligence service that can receive and filter outgoing and incoming DNS requests for users of the service and detect and/or mitigate threats.

The DNS firewall can capture global DNS traffic from and to user devices within a customer's internal network by configuring the customer's internal DNS server to forward global DNS traffic to the DNS firewall. However, user devices that are or can be moved outside the customer's internal network (e.g., mobile devices) can lose the protection offered by the DNS firewall.

Therefore, there is a need for systems and methods that provide protection from cyber threats outside of a protected internal network, while still providing full functionality and access to local resources for users.

SUMMARY

The present disclosure relates to systems, devices, and methods for resolving DNS requests.

In some embodiments, a computing device can send a first DNS request for a domain name associated with a local service device to a DNS firewall server, receive a response from the DNS firewall server that includes a status indicating a server failure, where the DNS firewall server indicated the server failure in response to determining that a record associated with the domain name could not be found, send a second DNS request to an internal DNS server in response to the status indicating the server failure, receive a response from the internal DNS server that includes an IP address associated with the local service device, and send a communication to the local service device using the IP address.

In other embodiments, a computing device can receive a first DNS request for a domain name associated with a local service device, determine that the first DNS request is associated with a customer of a DNS firewall service, determine that a record associated with the domain name cannot be found, and send a response that includes a status indicating a server failure in response to determining that the record could not be found and that the first DNS request is associated with a customer.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
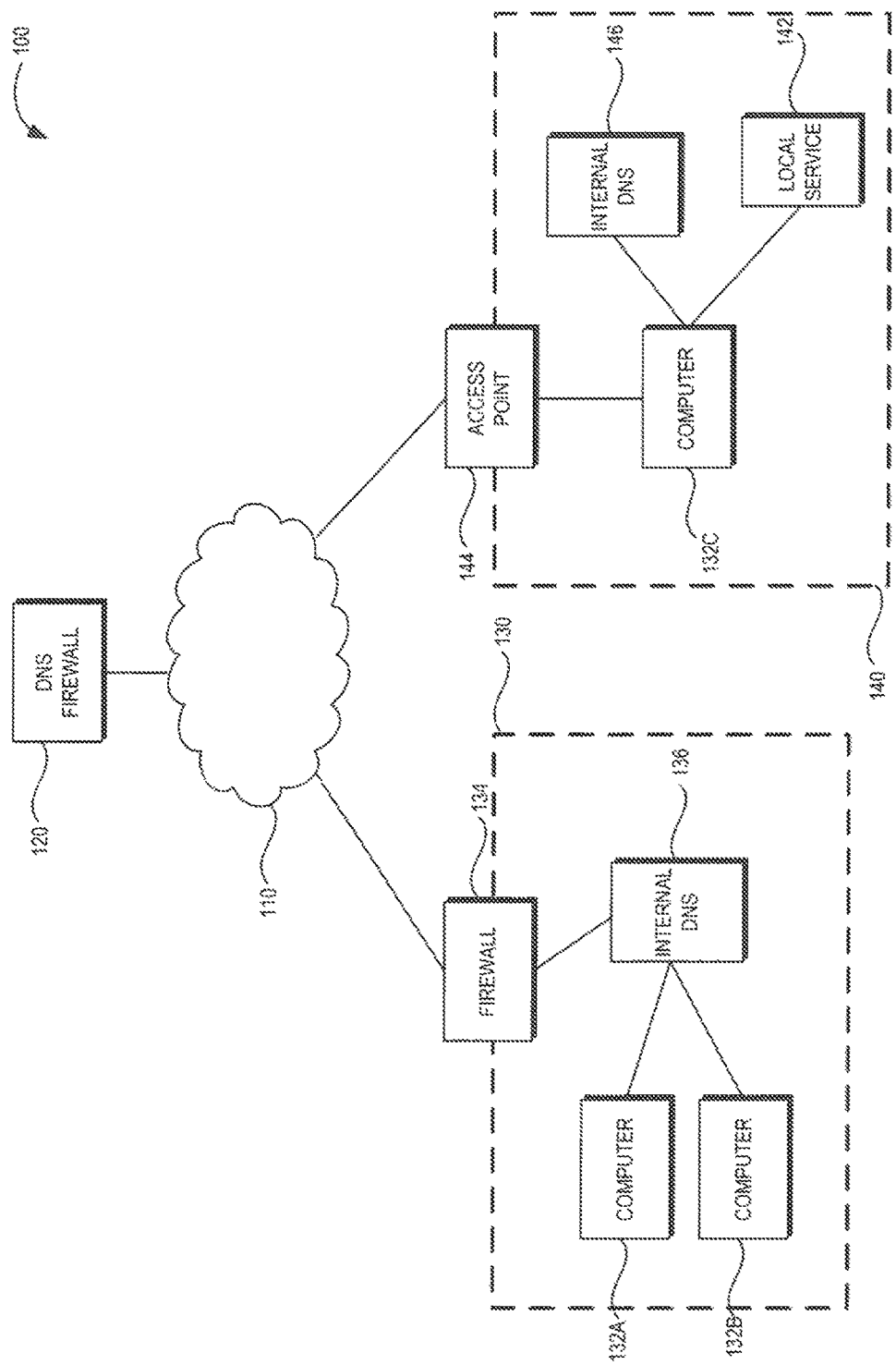
FIG. 1 is a diagram illustrating an example DNS, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

A customer of a DNS firewall or other cyber threat prevention service, such as an individual user, household, or organization, can have an internal DNS (e.g., within an organization and/or a local area network (LAN)) that responds to internal DNS requests with numerical device addresses (e.g., IP addresses). The internal DNS can be specifically configured to respond to internal DNS requests with internal device addresses and to forward non-internal DNS request (e.g., global DNS requests) to an external device (i.e., a remote device) that provides the DNS firewall service. Therefore, users can have access to local devices and services within the internal network(s) and can have the protection and privacy provided by the DNS firewall service for non-internal requests.

In some embodiments, the DNS firewall can determine whether to apply protections and/or which protections to apply based on the source address of a received request. For example, a DNS request from a source IP address that is part of a customer's defined network block can be identified and the appropriate protections can be applied. Accordingly, the end user devices within an internal network of the customer do not have to be specifically configured to use the DNS firewall service, and the end user devices can "inherit" the protections provided by the DNS firewall service by using the specifically configured internal DNS.

However, users may not always be within the protected and specifically configured internal network(s), and, thus, even if the user's device was configured to send DNS traffic to the DNS firewall, the DNS firewall may not be able to identify that the user's device is associated with a customer and/or which protections to apply. For example, employees of an organization may utilize home computers and/or may have mobile devices (e.g., laptops, mobile phones, tablet computers, etc.) that are utilized in public networks, non-protected private networks, etc.

Additionally, if the user's device is configured to send DNS traffic to the DNS firewall when outside of a protected internal network, the user's device would not be able to use DNS requests to access local services and/or devices (e.g., printers) within the local internal network to which the user's device is connected.

One potential solution is to configure the user's device to utilize a virtual private network (VPN) server to allow the user's device to be uniquely identified as being associated with a particular customer. In other words, the user's device can be configured to send DNS traffic through a VPN service (e.g., a VPN service provided by the provider of the DNS firewall) so that the user's device will appear to be part of a customer's defined network block and, thus, can be identified and the appropriate protections can be applied.

However, using such a solution, the user's device would still not be able to use DNS requests to access local services and/or devices when outside of the protected internal network(s) of the customer.

Accordingly, in some embodiments, the DNS firewall service can be configured to receive DNS requests from a user device associated with a customer, identify the user device based on the address of the user device (e.g., the IP address), identify which customer the user device is associated with, apply the appropriate protections, respond to global DNS requests with the appropriate numerical addresses, and respond to internal DNS requests with a response that directs the user's device to utilize an internal DNS of the local network to which they are connected, as discussed in further detail below.

FIG. 1 is a diagram illustrating an example DNS, consistent with certain disclosed embodiments. In some embodiments, DNS 100 can include network 110, DNS firewall server 120, internal network 130 and internal network 140. In some implementations, internal network 130 can be the internal network of a customer of a DNS firewall service associated with DNS firewall server 120 and can include computer 132A, computer 132B, internal DNS server 136, and firewall 134. In further implementations, internal network 140 can represent an internal network that is unknown and/or is associated with an entity unknown to the DNS firewall service and can include computer 132C, local service device 142, internal DNS server 146, and access point device 144.

In some embodiments, network 110 can represent any type of one or more wired and/or wireless telecommunications networks. For example, network 110 can represent the Internet and/or one or more telephone networks, one or more cellular networks, one or more LANs, etc. In some implementations, computing devices, such as, for example, computer 132A, computer 132B, and computer 132C, can connect to, for example, DNS firewall server 120 and/or a global DNS server via network 110.

In some embodiments, DNS firewall server 120 can represent one or more computer devices. For example, DNS firewall server 120 can represent database servers, web servers, mainframe computers, etc. used to provide a DNS firewall service. In some embodiments, DNS firewall server 120 can receive DNS requests from customers and non-customers and provide DNS responses to non-customers and DNS responses and/or DNS firewall protection to customers. In further implementations, DNS firewall server 120 can identify which customers, if any, a DNS request is associated with, apply appropriate protections, if necessary, respond to DNS requests with the appropriate numerical addresses, and respond to internal DNS requests (e.g., requests associated with local resources available to users within an internal network) with a response that directs the requesting device to utilize an internal DNS of the local network to which they are connected, as discussed in further detail below. DNS firewall server 120 can provide DNS firewall protection services that include identifying and mitigating, for example, requests for malicious websites, requests associated with DoS attacks (e.g., botnets, command and control server (C&C) commands, etc.), and the like.

In some implementations, internal network 130 can be the internal network of a customer (e.g., a business, an agency, an individual, etc.) of a DNS firewall service associated with DNS firewall server 120. For example, internal network 130 can be one or more LANs that include one or more wired and/or wireless connections.

In further implementations, internal network 140 can be an internal network that is unknown and/or is associated with an entity unknown to the DNS firewall service associated with DNS firewall server 120. For example, internal network 140 can be one or more LANs that include one or more wired and/or wireless connections.

In some embodiments, computers 132A, 132B, and 132C can each represent one or more computing devices. For example, computers 132A-C can represent database servers, web servers, mainframe computers, etc. Additionally or alternatively, computers 132A-C can represent end user computing devices such as, for example, desktop computers, laptops, tablet devices, mobile phones (e.g., smartphones), etc. In various embodiments, computers 132A-C can represent computing devices associated with a customer (e.g., the customer associated with internal network 130) of a DNS firewall service (e.g., a DNS firewall service associated with DNS firewall 120).

As shown in FIG. 1, computer 132A and computer 132B are within internal network 130, and computer 132C is within internal network 140. For the sake of example, computers 132A-C can be computing devices of employees of a customer of a DNS firewall service provided by DNS firewall 120. Accordingly, computers 132A and B are within the customer's internal network, while computer 132C is on an outside network. For example, computer 132C can represent a mobile device of an employee of an organization associated with internal network 130, and the employee may be working remotely (e.g., from home, from a coffee shop, etc.).

In various embodiments, computers 132A-C can include a stub resolver application that is used by other applications on the computer to resolve domain names and can be configured such that DNS requests are forwarded through internal DNS server 136 when computers 132A-C are within internal network 130. Accordingly, computers 132A and B, which are within internal network 130, send DNS requests through internal DNS server 136.

In some embodiments, internal DNS server 136 can represent one or more computing devices. For example, internal DNS server 136 can represent database servers, web servers, mainframe computers, etc. used to provide a DNS service for the customer associated with internal network 130. In some embodiments, internal DNS server 136 can receive DNS requests from computing devices (e.g., computer 132A and B) and be configured to provide DNS responses to internal DNS requests and forward global DNS requests to DNS firewall server 120 (e.g., via firewall 134). Accordingly, devices within internal network 130 can be provided the privacy and protection of the services offered by DNS firewall server 120 and can still access local devices within internal network 130 using DNS.

In some implementations, firewall 134 can represent one or more computing devices. For example, firewall 134 can represent an access point device (e.g., a router, a network switch, etc.) that connects internal network 130 to a wide area network, such as the Internet. In further embodiments, firewall 134 can additionally provide firewall services, such as, for example, monitoring and controlling incoming and outgoing network traffic based on network security rules.

In some embodiments, internal DNS server 146 can represent one or more computing devices. For example, internal DNS server 146 can represent database servers, web servers, mainframe computers, etc. used to provide a DNS service for devices within internal network 140. In some embodiments, internal DNS server 146 can receive DNS requests from computing devices (e.g., computer 132C) and be configured to provide DNS responses to internal DNS requests. In further embodiments, internal DNS server 146 can also be configured to forward global DNS requests to a global DNS service (e.g., via access point 144).

In some embodiments, access point device 144 can represent one or more computing devices. For example, access point device 144 can represent, for example, a router, a network switch, etc. that connects internal network 140 to a wide area network, such as the Internet. In further embodiments, access point device 144 may additionally provide firewall services, such as, for example, monitoring and controlling incoming and outgoing network traffic based on network security rules.

In various embodiments, computers 132A-C can be configured such that DNS requests are forwarded to DNS firewall server 120 when computers 132A-C are not within internal network 130. For example, computers 132A-C can be configured to utilize a VPN server to allow computers 132A-C to be uniquely identified as being associated with a particular customer.

Additionally, a VPN client application running on computers 132A-C can be configured so that computers 132A-C use at least two DNS servers. The first DNS server can be DNS firewall server 120, and the second DNS server can be an internal DNS server of the internal network to which the computer is connected (e.g., internal DNS server 146). In various embodiments, the VPN client application can be configured to access both DNS firewall server 120 and an internal DNS server (e.g., internal DNS server 136 or 146) in an ordered list for a DNS request. That is, the VPN client application will send DNS requests first to DNS firewall server 120 and then to an originally configured DNS server (e.g., the internal DNS server). For example, the VPN client application can configure an operating system (or a stub resolver of the operating system) of the client computer (e.g., computers 132A-C) to communicate with DNS servers based on the ordered list. This provides DNS firewall protection to the client computer.

For cases where the client computer requests a local service with a DNS request, the domain name may not exist in the external network (NXDOMAIN). However, DNS firewall server 120 would return instead SERVFAIL (explained in further detail below), signaling the VPN client application to repeat the DNS request to the internal DNS server, and thus access internal resources while still having the DNS firewall protection for external resources.

Accordingly, computer 132C, which is within internal network 140 and not internal network 130, can send DNS requests to DNS firewall server 120, and computer 132C can still be provided the privacy and protection of the services offered by DNS firewall server 120. Additionally, as discussed in further detail below with reference to FIG. 2, computer 132C can still access local devices within internal network 140 using DNS. For example, based on network settings of the VPN client application used by computer 132C, computer 132C can use the second DNS server (e.g., internal DNS server 146) after receiving an indication of a server failure from the first DNS server, as discussed below.

In some implementations, local service device 142 can represent one or more computing devices and/or one or more computer peripheral devices. For example, local service device 142 can represent, for example, a mobile device, a printer, a server, a storage device, a router, a database server, etc. that is available for user devices on internal network 140. As an example, local service device 142 can represent a device that provides a service that a user of computer 132C attempts to utilize. Accordingly, as discussed in further detail below, computer 132C can send a DNS request to DNS firewall 120, computer 132C can receive a response from DNS firewall 120 (e.g., an indication of a server failure) that directs computer 132C to send the DNS request to internal DNS server 146 (e.g., based on network settings of the VPN client application), computer 132C can receive the numerical address of local service device 142, and computer 132C can communicate with local service device 142 using the received numerical address to use a service provided by local service device 142 (e.g., print a document).

The schematic depicted in FIG. 1 is merely for the purpose of illustration and is not intended to be limiting. Further, the DNS depicted is merely a simplified example of a DNS, consistent with certain disclosed embodiments, but such an example is not intended to be limiting. For example, in various embodiments, the DNS can include additional networks, servers, computers, service devices, access point devices, firewalls, DNS firewalls, internal DNS servers, and/or other devices. Additionally, the described devices can be separate devices, as pictured, or various devices can be combined, consistent with certain disclosed embodiments.

Figure 2:
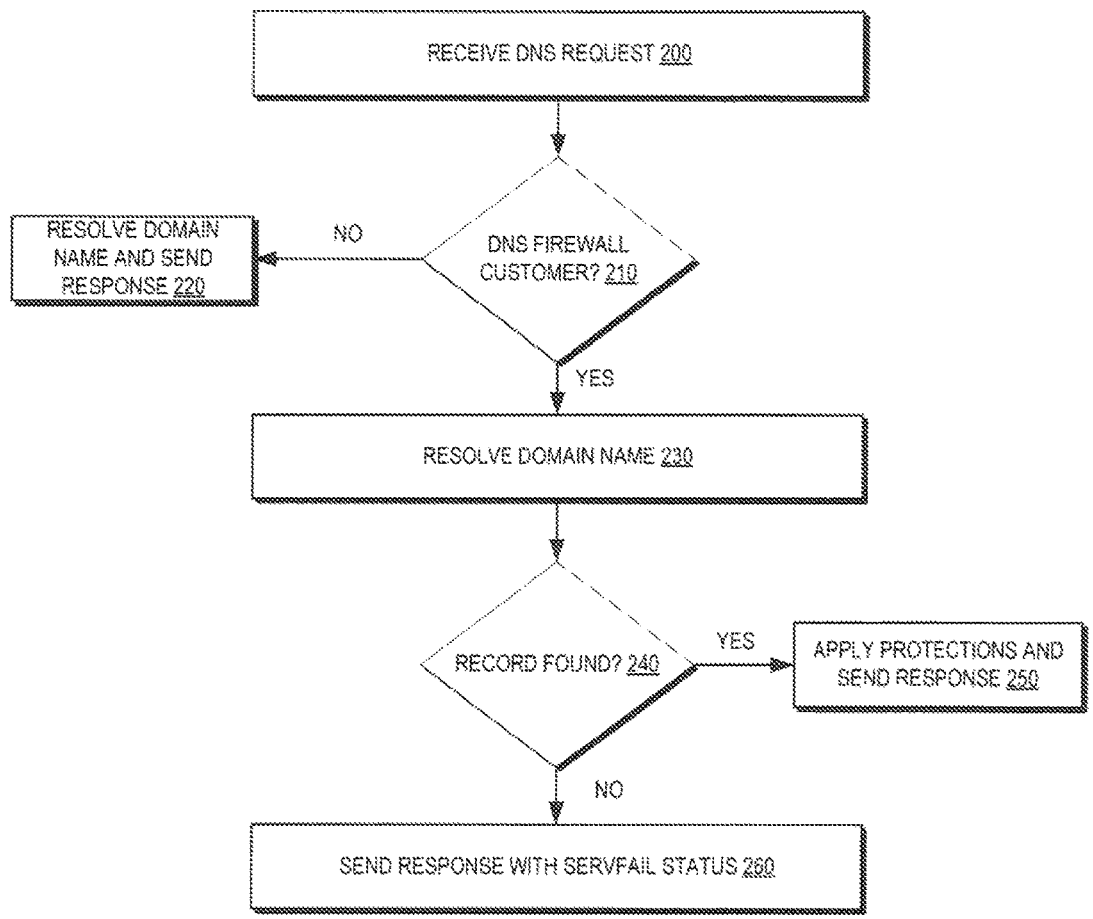
FIG. 2 is a flow diagram illustrating an example process for providing a DNS firewall, consistent with certain disclosed embodiments.

FIG. 2 is a flow diagram illustrating an example process for providing a DNS firewall, consistent with certain disclosed embodiments. In some embodiments, the method described in FIG. 2 can be performed using a computing device such as, for example, a database server, a web server, a mainframe computer, etc. For example, the method described in FIG. 2 can be performed by DNS firewall server 120 in FIG. 1.

In various embodiments, the computing device can be, for example, a domain name registry and/or a name server, and can maintain and/or have access to a database of domain name records.

The process can begin in 200, when the computing device receives a DNS request from a device. In some embodiments, the DNS request can include a domain name and an address of the request. The address of the request can be, for example, an IP address associated with a computer and/or network that sent the request or an IP address associated with a VPN that forwarded the request from the computer and/or network that sent the request.

In 210, the computing device can determine whether the address of the request is associated with a DNS firewall customer. In some embodiments, the computing device can maintain a database of IP addresses and/or IP address blocks associated with customers of a DNS firewall service. Accordingly, the computing device can compare the address of the request with entries in the database to determine whether the address of the request is associated with a customer.

If, in 210, the computing device determines that the address of the request is not associated with a DNS firewall customer (NO in 210), then the computing device can, in 220, resolve the domain name based on the request. For example, the computing device can resolve the domain name by searching for a record associated with the domain name. The computing device can additionally send a response to the request that includes an IP address associated with the record, if one is found.

In further embodiments, the computing device can include a DNS request status with the response. In some implementations, the status can be one of at least three options. For example, the status can be NOERROR, which indicates that the domain name was successful resolved. As an additional example, the status can be NXDOMAIN, which indicates that the computing device does not have a record associated with the domain name (i.e., a non-existent domain name). As a further example, the status can be SERVFAIL, which indicates that the computing device encountered a server failure (i.e. an error occurred). As an example, the status can be a SERVFAIL if a Domain Name System Security Extensions (DNSSEC) validation determined that a record associated with the domain name was not correctly signed.

After resolving the domain name and sending the response, the process can return to 200 and the computing device can receive a subsequent DNS request.

If, in 210, the computing device determines that the address of the request is associated with a DNS firewall customer (YES in 210), then the computing device can, in 230, resolve the domain name by searching for a record associated with the domain name.

In 240, the computing device can determine whether a record associated with the domain name is found.

If, in 240, a record associated with the domain name is found (YES in 240), the computing device can, in 250, apply DNS firewall protections. DNS firewall protections can include identifying and mitigating, for example, requests for malicious websites, requests associated with DoS attacks (e.g., botnets, C&C servers, etc.), and the like. As an example, the computing device can generate, maintain, and/or have access to a list of domain names and/or IP addresses associated with such cyber threats (e.g., a domain name associated with a compromised device in a botnet, an IP address of a C&C server, etc.). Accordingly, the computing device can block DNS requests for domain names associated with cyber threats by, for example, responding to the requests with responses that include NXDOMAIN statuses and that do not include a determined IP address. As another example, the computing device can block DNS requests for domain names associated with cyber threats by responding to the requests with a different IP address (e.g., a landing page that indicates that a threat has been identified and/or an address of honeypot page to deflect the potential threat) and a NOERROR status.

If the domain name is not associated with any cyber threats, the computing device can send a response that includes the determined IP address. The response will also include a NOERROR status.

After resolving the domain name, applying the protections, and sending the response, the process can return to 200 and the computing device can receive a subsequent DNS request.

If, in 240, a record associated with the domain name is not found (NO in 240), instead of sending a response with an NXDOMAIN status, as discussed above in 220 for when no record is found for a non-customer, the computing device can, in 260, send a response with a SERVFAIL status. In various embodiments, the SERVFAIL status can direct the device that sent the DNS request to utilize an internal DNS of the local network to which it is connected, as discussed in further detail below.

After sending the response, the process can return to 200 and the computing device can receive a subsequent DNS request.

While the steps depicted in FIG. 2 have been described as performed in a particular order, the order described is merely an example, and various different sequences of steps can be performed, consistent with certain disclosed embodiments. For example, the computing device can resolve the domain name prior to determining whether the request is associated with a DNS firewall customer. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 3:
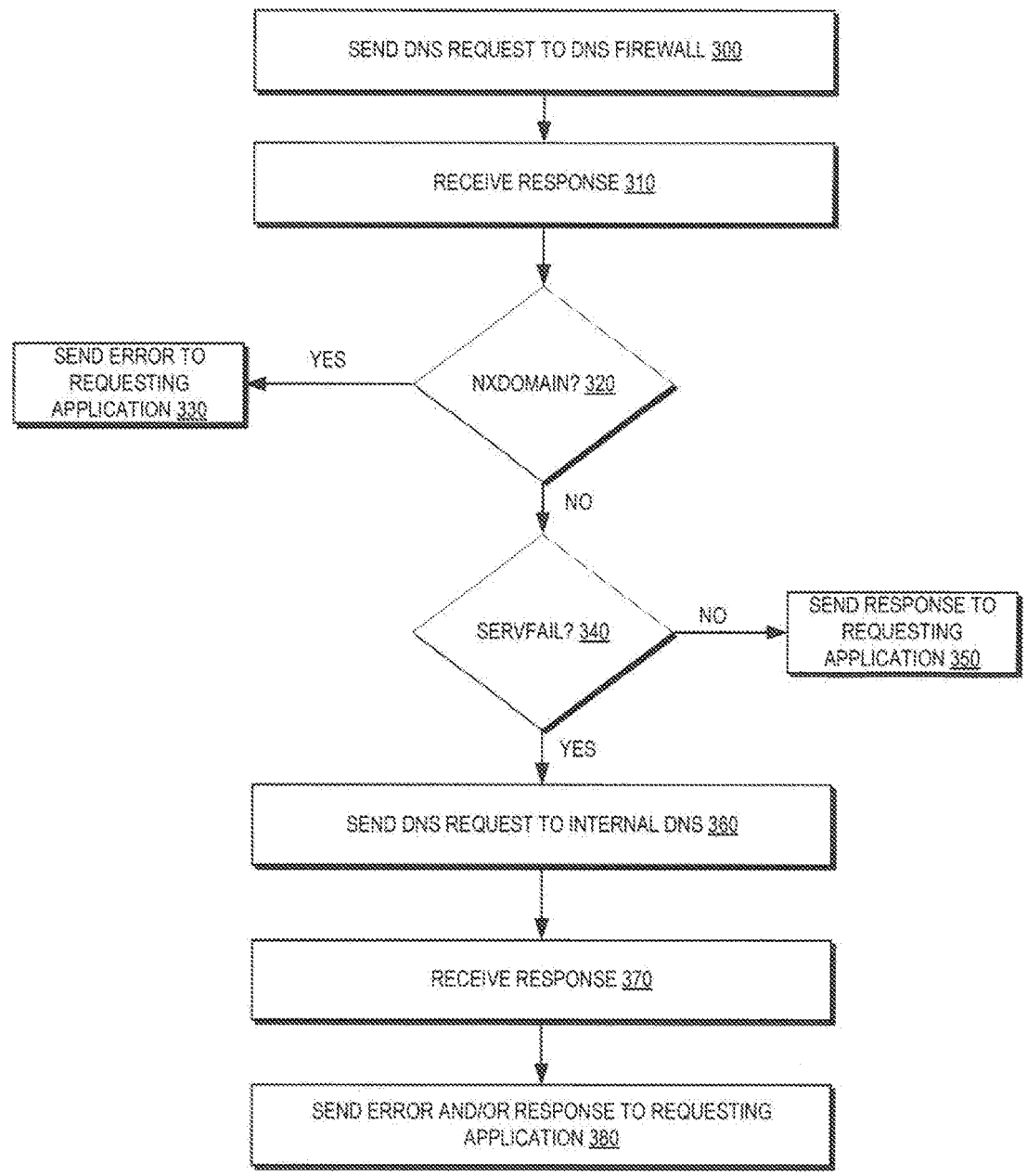
FIG. 3 is a flow diagram illustrating an example process for resolving a domain name, consistent with certain disclosed embodiments.

FIG. 3 is a flow diagram illustrating an example process for resolving a domain name, consistent with certain disclosed embodiments. In some embodiments, the method described in FIG. 3 can be performed using a computing device such as, for example, a database server, a web server, a mainframe computer, etc. In other embodiments, the method described in FIG. 3 can be performed using an end user computing device such as, for example, a desktop computer, a laptop computer, a smartphone, a tablet computer, etc. For example, the method described in FIG. 2 can be performed by one of computers 132A-C in FIG. 1.

In various embodiments, the example process can be performed using a stub resolver application running on a device that can, for example, generate DNS requests based on requests from other applications running on the device, transmit DNS requests to DNS firewall servers or internal DNS servers, receive DNS responses, cache DNS records, send information to other applications running on the device in response to DNS responses, etc.

In some implementations, certain computing devices and/or operating systems of the computing devices may allow limited configuration of the computing device, the operating system, the stub resolver, a VPN client application, and/or other applications running on the computing device. For example, an iOS® mobile operating system from Apple Inc.® (e.g., iOS® version 9.2) may only allow such limited configurations. For example, an iOS® mobile operating system may not allow a device to use a local DNS proxy. However, with minimal configurations (e.g., of the VPN client application, as discussed above), the iOS® mobile operating system can allow the stub resolver to attempt to first send a DNS request to a DNS firewall service (e.g., via the VPN) if the computing device is not on a particular internal network, and can attempt to send a DNS request to an internal DNS server if the response from the DNS firewall service includes a SERVFAIL status or times out. Accordingly, a computing device associated with a DNS firewall customer that utilizes the iOS® mobile operating system can perform the process described with regard to FIG. 3 to receive the privacy and protections of the DNS firewall service, while still being able to utilize local services on a network outside the customer's internal network.

The process can begin in 300, when the computing device sends a DNS request to a DNS firewall (e.g. DNS firewall server 120 in FIG. 1). In some embodiments, the DNS request can include a domain name and an address of the request. The address of the request can be, for example, an IP address associated with the computing device. In further embodiments, the DNS request can be sent using a VPN client application on the computing device. The VPN client application can be configured to first send the DNS request to the DNS firewall. The DNS request can be sent via a VPN server, and the address of the request can be an IP address associated with the VPN.

In 310, the computing device can receive a response from the DNS firewall. The response can include a numerical address associated with the domain name in the request and/or a DNS request status.

Alternatively, the computing device can determine that the DNS request has timed out (e.g., after 30 seconds without receiving a response). If the request times out, in some embodiments, the computing device can proceed to 360, as discussed below.

In 320, the computing device can determine whether the status is an NXDOMAIN status.

If the status is an NXDOMAIN status (YES in 320), the computing device can determine that the domain name does not exist and, in 330, send an error to the requesting application. However, in various embodiments, if the computing device is associated with a customer of a DNS firewall service, the computing device may not receive responses with an NXDOMAIN status if the computing device is identified as being associated with a customer and/or uses a VPN associated with the customer, as discussed above with regard to FIG. 2.

Accordingly, if the status is not an NXDOMAIN status (NO in 320), the computing device can proceed to 340 and determine whether the status is a SERVFAIL status.

If the status is not a SERVFAIL status (NO in 340), in some embodiments, the status will be a NOERROR status and the response will include the numerical address associated with the requested domain name. Accordingly, the computing device can proceed to 350 and send a response that includes the numerical address to the requesting application.

If the status is a SERVFAIL status (YES in 340), the computing device can proceed to 360. As discussed above with regard to FIG. 2, in some embodiments, a SERVFAIL status can result from a server failure and/or a non-existent domain name record.

In 360, the computing device can send a DNS request to an internal DNS server (e.g. Internal DNS server 146 in FIG. 1). In some embodiments, the DNS request can include the domain name. In further embodiments, the DNS request can be sent using the VPN client application on the computing device. The VPN client application can be configured to send the DNS request to an internal DNS server after the DNS request to the DNS firewall fails (e.g., a server failure or request time out).

In 370, the computing device can receive a response from the internal DNS server. The response can include a numerical address associated with the domain name in the request and/or a DNS request status (e.g., NOERROR, NXDOMAIN, SERVFAIL, etc.).

Alternatively, the computing device can determine that the DNS request has timed out (e.g., after 30 seconds without receiving a response).

In 380, the computing device can send an error to the requesting application if the DNS request status is NXDOMAIN or SERVFAIL or if the DNS request timed out.

Alternatively, (e.g., if the status is NOERROR) the computing device can send a response that includes the numerical address to the requesting application.

If the response from the internal DNS server includes a NOERROR status, then the domain name may be associated with a local service. Accordingly, using the numerical address of the local service, the computing device can access the device that provides the local service (e.g., a printer) and can utilize the device (e.g., print a document).

While the steps depicted in FIG. 3 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 4:
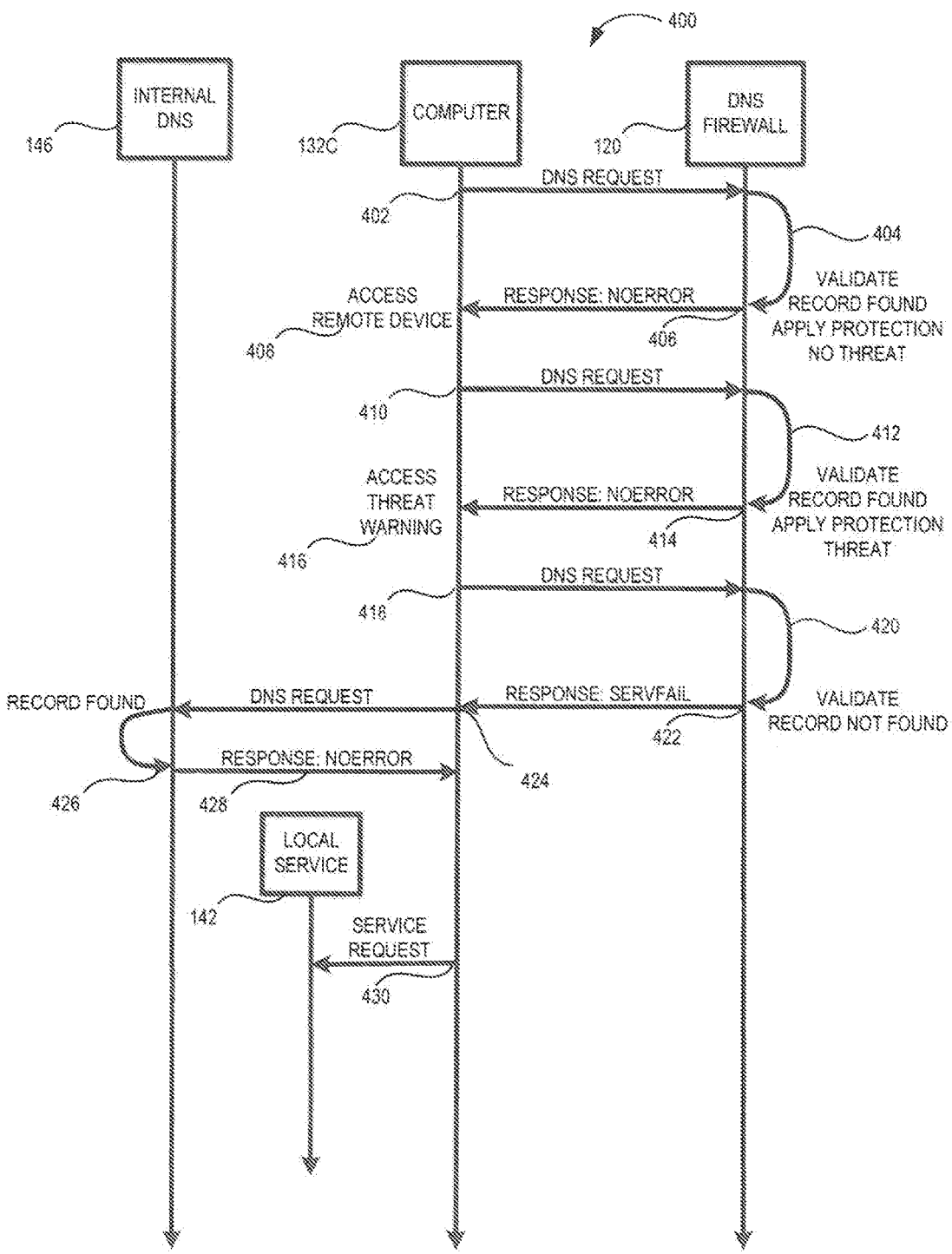
FIG. 4 is a flow diagram illustrating example communications in a DNS, consistent with certain disclosed embodiments.

FIG. 4 is a flow diagram illustrating example communications in a DNS, consistent with certain disclosed embodiments. In some embodiments, DNS 400 can include a computer, an internal DNS server, a DNS firewall server, and a local service device. For the sake of example, FIG. 4 references computer 132C, DNS firewall server 120, internal DNS server 146, and local service device 142, as described with regard to FIG. 1. Accordingly, computer 132C can be associated with a customer of a DNS service and located on an internal network that is not associated with the customer.

In 402, computer 132C can send a DNS request to DNS firewall server 120. The DNS request can be a global DNS request to access a webpage, and the request can be sent via a VPN associated with the customer. The DNS request can include a domain name (e.g., WWW.EXAMPLE1.COM) and an IP address associated with the VPN.

In 404, DNS firewall server 120 can receive the DNS request, locate the record associated with the domain name to determine the IP address associated with the domain name, and determine whether the DNS request is associated with a DNS firewall service customer by validating computer 132C. Because computer 132C sent the DNS request via the VPN, DNS firewall server 120 can validate that the IP address in the DNS request is associated with a customer. Accordingly, DNS firewall server 120 can apply DNS firewall protections. In 404, DNS firewall server 120 can determine that the requested domain name and/or the IP address are not associated with a cyber threat.

In 406, because the requested domain name and/or the IP address are not associated with a cyber threat, DNS firewall server 120 can send a response that includes the IP address and a status of NOERROR to computer 132C.

In 408, computer 132C can access a remote device using the IP address in the response to access the webpage associated with WWW.EXAMPLE1.COM.

In 410, computer 132C can send a DNS request to DNS firewall server 120. The DNS request can be a global DNS request to access a server, and the request can be sent via a VPN associated with the customer. The DNS request can include a domain name (e.g., WWW.EXAMPLE2.COM) and an IP address associated with the VPN.

In 412, DNS firewall server 120 can receive the DNS request, locate the record associated with the domain name to determine the IP address associated with the domain name, and determine whether the DNS request is associated with a DNS firewall service customer by validating computer 132C. Because computer 132C sent the DNS request via the VPN, DNS firewall server 120 can validate that the IP address in the DNS request is associated with a customer. Accordingly, DNS firewall server 120 can apply DNS firewall protections. In 412, DNS firewall server 120 can determine that the requested domain name and/or the IP address are associated with a cyber threat (e.g., a botnet).

In 414, because the requested domain name and/or the IP address are associated with a cyber threat, DNS firewall server 120 can send a response that includes an IP address of a landing page that indicates that a threat has been identified and a status of NOERROR to computer 132C.

In 416, computer 132C can access a remote device using the IP address in the response to access the landing page. Computer 132C does not access the device associated with WWW.EXAMPLE2.COM.

In 418, computer 132C can send a DNS request to DNS firewall server 120. The DNS request can be an internal DNS request to access local service device 142, and the request can be sent via a VPN associated with the customer. The DNS request can include a domain name (e.g., WWW.EXAMPLE3.COM) and an IP address associated with the VPN.

In 420, DNS firewall server 120 can receive the DNS request, attempt to locate the record associated with the domain name, and determine whether the DNS request is associated with a DNS firewall service customer by validating computer 132C. Because computer 132C sent the DNS request via the VPN, DNS firewall server 120 can validate that the IP address in the DNS request is associated with a customer. However, DNS firewall server 120 can determine that there is not record associated with the domain name.

In 422, because a record was not found, DNS firewall server 120 can send a response that includes a status of SERVFAIL to computer 132C.

In 424, computer 132C can receive the response and, based on the response including the status of SERVFAIL, send a DNS request to internal DNS server 146. The DNS request can include the domain name (e.g., WWW.EXAMPLE3.COM).

In 426, internal DNS server 146 can receive the DNS request and locate the record associated with the domain name to determine the IP address associated with the domain name.

In 428, because the record is found, internal DNS server 146 can send a response that includes the IP address and a status of NOERROR to computer 132C.

In 430, computer 132C can communicate with local service device 142 using the IP address in the response to send a service request to local service device 142 (e.g., instructions to print a document).

While the steps depicted in FIG. 4 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Additionally, the devices depicted in FIG. 4 are merely for the purpose of illustration and is not intended to be limiting. Further, the DNS depicted is merely a simplified example of a DNS, consistent with certain disclosed embodiments, but such an example is not intended to be limiting. For example, in various embodiments, the DNS can include additional networks, servers, computers, service devices, access point devices, firewalls, DNS firewalls, internal DNS servers, and/or other devices. Additionally, the described devices can be separate devices, as pictured, or various devices can be combined, consistent with certain disclosed embodiments.

Figure 5:
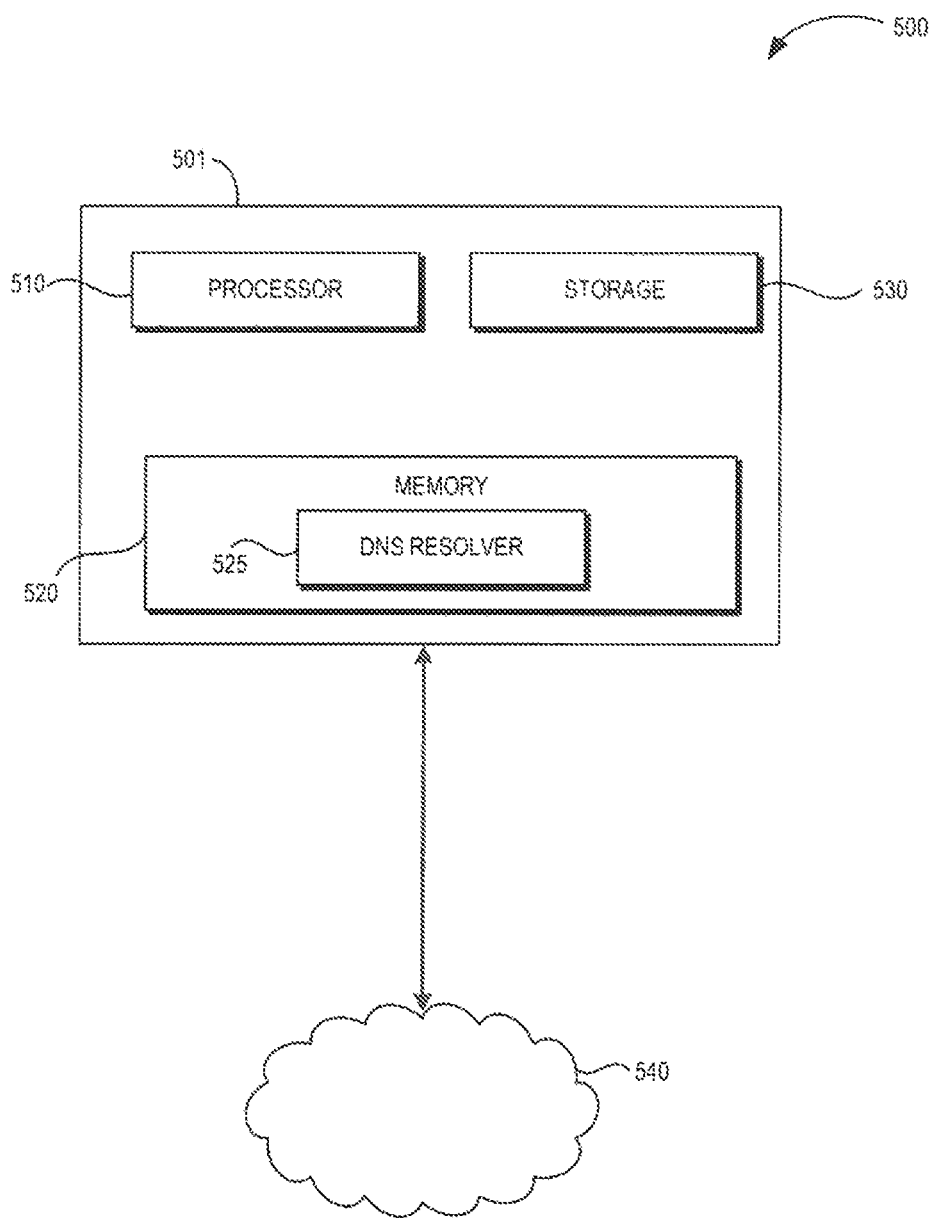
FIG. 5 is a diagram illustrating an example of a hardware system for DNS resolution, consistent with certain disclosed embodiments.

FIG. 5 is a diagram illustrating an example of a hardware system for DNS resolution, consistent with certain disclosed embodiments. An example hardware system 500 includes example system components that may be used. The components and arrangement, however, may be varied.

Computer 501 may include processor 510, memory 520, storage 530, and input/output (I/O) devices (not pictured). The computer 501 may be implemented in various ways and can be configured to perform any of the embodiments described above. In some embodiments, computer 501 can be a computer of an end user such as, for example, a desktop computer, a laptop, a tablet device, a mobile device (e.g., a smartphone), etc. In other embodiments, computer 501 can be a computing device such as, for example, a database server (e.g., a domain name registry and/or name server), a web server, a mainframe computer, etc. For example, computer 501 can be DNS firewall server 120 and/or computers 132A-C in FIG. 1. Computer 501 may be standalone or may be part of a subsystem, which may, in turn, be part of a larger system.

The processor 510 may include one or more known processing devices, such as a microprocessor from the Intel Core™ family manufactured by Intel™, the Phenom™ family manufactured by AMD™, or the like. Memory 520 may include one or more storage devices configured to store information and/or instructions used by processor 510 to perform certain functions and operations related to the disclosed embodiments. Storage 530 may include a volatile or non-volatile, magnetic, semiconductor, tape, optical, removable, non-removable, or other type of computer-readable medium used as a storage device. In some embodiments, storage 530 can include, for example, domain name records, DNS firewall customer IP addresses and/or IP address blocks, etc.

In an embodiment, memory 520 may include one or more programs or subprograms including instructions that may be loaded from storage 530 or elsewhere that, when executed by computer 501, perform various procedures, operations, or processes consistent with disclosed embodiments. For example, memory 520 may include DNS resolver program 525 for generating DNS requests, searching for DNS records, applying DNS firewall protections, providing DNS responses, and/or receiving DNS responses, according to various disclosed embodiments. Memory 520 may also include other programs that perform other functions, operations, and processes, such as programs that provide communication support, Internet access, etc. The DNS resolver program 525 may be embodied as a single program, or alternatively, may include multiple sub-programs that, when executed, operate together to perform the function of the DNS resolver program 525 according to disclosed embodiments. In some embodiments, DNS resolver program 525 can perform all or part of the processes of FIGS. 2-4, described above.

Computer 501 may communicate over a link with network 540. For example, the link may be a direct communication link, a local area network (LAN), a wide area network (WAN), or other suitable connection. Network 540 may include the internet, as well as other networks, which may be connected to various systems and devices.

Computer 501 may include one or more input/output (I/O) devices (not pictured) that allow data to be received and/or transmitted by computer 501. I/O devices may also include one or more digital and/or analog communication I/O devices that allow computer 501 to communicate with other machines and devices. I/O devices may also include input devices such as a keyboard or a mouse, and may include output devices such as a display or a printer. Computer 501 may receive data from external machines and devices and output data to external machines and devices via I/O devices. The configuration and number of input and/or output devices incorporated in I/O devices may vary as appropriate for various embodiments.

Example uses of the system 500 can be described by way of example with reference to the embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system, comprising:
    a processing system of a DNS firewall server comprising one or more processors; and
    a memory system comprising one or more computer-readable media, wherein the one or more computer-readable media contain instructions that, when executed by the processing system, cause the processing system to perform operations comprising:
        receiving, from a client device in a local network, a first Domain Name System (DNS) request, the first DNS request comprising a domain name associated with a local service device within the local network;
        determining that the first DNS request is associated with a customer of a DNS firewall service;
        determining that a record associated with the domain name cannot be found at the DNS firewall server;
        sending, to the client device in the local network, a first response comprising a first status indicating that:
            a server failure error has occurred in response to determining that the record could not be found at the DNS firewall server, and
            the first DNS request is associated with the customer,
        wherein the device:
            sends, in response to the first status, a second DNS request to an internal DNS server;
            receives, from the internal DNS server, a DNS response comprising an Internet Protocol (IP) address associated with the local service device; and
            sends, to the local service device, a communication using the IP address.

2. The system of claim 1, wherein the first DNS request is sent using a virtual private network (VPN).

3. The system of claim 2, wherein determining that the first DNS request is associated with the customer of the DNS firewall service is based on an IP address associated with the VPN.

4. The system of claim 3, the operations further comprising:
    receiving a third DNS request, the third DNS request comprising a second domain name associated with a remote device;
    obtaining a record associated with the second domain name comprising an IP address of the remote device; and
    sending a second response comprising the IP address of the remote device and a status indicating no error in response to determining that at least one of the second domain name and the IP address of the remote device are not associated with a cyber threat.

5. The system of claim 3, the operations further comprising:
    receiving a third DNS request, the third DNS request comprising a second domain name associated with a remote device;
    obtaining a record associated with the second domain name comprising an IP address of the remote device; and
    sending a second response comprising a status indicating at least one of no error or a non-existent domain based on determining that at least one of the second domain name and the IP address of the remote device are associated with a cyber threat.

6. The system of claim 1, the operations further comprising:
    receiving, from a second device, a third DNS request, the third DNS request comprising a second domain name;
    determining that a record associated with the second domain name cannot be found at the DNS firewall server;
    determining that the third DNS request did not originate from a customer of the DNS firewall service based on an IP address of the second device; and
    sending a response comprising a second status that is different than the first status, wherein the second status indicates a non-existent domain, in response to the determining that the record associated with the second domain name could not be found at the DNS firewall server and the determining that the third DNS request is not associated with a customer of the DNS firewall service.

7. The system of claim 1, wherein the internal DNS server is located the local network.

8. The system of claim 7, wherein the client device is running a mobile operating system.

9. The system of claim 7, wherein the local network is outside of an internal network of a customer of the DNS firewall service.

10. The system of claim 1, wherein the local service device is a printer and the communication comprises instructions to print a document.

11. A computer-implemented method, comprising:
receiving, from a client device in a local network, a first Domain Name System (DNS) request, the first DNS request comprising a domain name associated with a local service device within the local network;
determining that the first DNS request is associated with a customer of a DNS firewall service;
determining that a record associated with the domain name cannot be found at the DNS firewall server;
sending, to the client device in the local network, a first response comprising a first status indicating that:
a server failure error has occurred in response to determining that the record could not be found at the DNS firewall server, and
the first DNS request is associated with the customer, wherein the client device:
sends, in response to the first status, a second DNS request to an internal DNS server;
receives, from the internal DNS server, a DNS response comprising an Internet Protocol (IP) address associated with the local service device; and
sends, to the local service device, a communication using the IP address.

12. The computer-implemented method of claim 11, wherein determining that the first DNS request is associated with the customer of the DNS firewall service is based on an IP address associated with the first DNS request.

13. The computer-implemented method of claim 11, further comprising:
receiving a third DNS request, the third DNS request comprising a second domain name associated with a remote device;
obtaining a record associated with the second domain name comprising an IP address of the remote device; and
sending a second response comprising the IP address of the remote device and a status indicating no error in response to determining that at least one of the second domain name and the IP address of the remote device are not associated with a cyber threat.

14. The computer-implemented method of claim 11, further comprising:
receiving a third DNS request, the third DNS request comprising a second domain name associated with a remote device;
obtaining a record associated with the second domain name comprising an IP address of the remote device; and
sending a second response comprising a status indicating at least one of no error or a non-existent domain based on determining that at least one of the second domain name and the IP address of the remote device are associated with a cyber threat.

15. The computer-implemented method of claim 11, further comprising:
receiving, from a second device, a third DNS request, the third DNS request comprising a second domain name;
determining that a record associated with the second domain name cannot be found at the DNS firewall server;
determining that the third DNS request did not originate from a customer of the DNS firewall service based on an IP address of the second device; and
sending a response comprising a second status that is different than the first status, wherein the second status indicates a non-existent domain, in response to the determining that the record associated with the second domain name could not be found at the DNS firewall server and the determining that the third DNS request is not associated with a customer of the DNS firewall service.

16. A non-transitory computer readable medium having instructions to perform a method comprising:
receiving, from a client device in a local network, a first Domain Name System (DNS) request, the first DNS request comprising a domain name associated with a local service device within the local network;
determining that the first DNS request is associated with a customer of a DNS firewall service;
determining that a record associated with the domain name cannot be found at the DNS firewall server;
sending, to the client device in the local network, a first response comprising a first status indicating that:
a server failure error has occurred in response to determining that the record could not be found at the DNS firewall server, and
the first DNS request is associated with the customer, wherein the device:
sends, in response to the first status, a second DNS request to an internal DNS server failure;
receives, from the internal DNS server, a DNS response comprising an Internet Protocol (IP) address associated with the local service device; and
sends, to the local service device, a communication using the IP address.

17. The non-transitory computer readable medium of claim 16, wherein determining that the first DNS request is associated with the customer of the DNS firewall service is based on an IP address associated with the first DNS request.

18. The non-transitory computer readable medium of claim 16, wherein the method further comprises:
receiving a third DNS request, the third DNS request comprising a second domain name associated with a remote device;
obtaining a record associated with the second domain name comprising an IP address of the remote device; and
sending a second response comprising the IP address of the remote device and a status indicating no error in response to determining that at least one of the second domain name and the IP address of the remote device are not associated with a cyber threat.

19. The non-transitory computer readable medium of claim 16, wherein the method further comprises:
receiving a third DNS request, the third DNS request comprising a second domain name associated with a remote device;
obtaining a record associated with the second domain name comprising an IP address of the remote device; and
sending a second response comprising a status indicating at least one of no error or a non-existent domain based on determining that at least one of the second domain name and the IP address of the remote device are associated with a cyber threat.

20. The non-transitory computer readable medium of claim 16, wherein the method further comprises:
receiving, from a second device, a third DNS request, the third DNS request comprising a second domain name;
determining that a record associated with the second domain name cannot be found at the DNS firewall server;

determining that the third DNS request did not originate from a customer of the DNS firewall service based on an IP address of the second device; and sending a response comprising a second status that is different than the first status, wherein the second status indicates a non-existent domain, in response to the determining that the record associated with the second domain name could not be found at the DNS firewall server and the determining that the third DNS request is not associated with a customer of the DNS firewall service.

* * * * *